(12) United States Patent
Chaston et al.

(10) Patent No.: US 9,932,043 B2
(45) Date of Patent: Apr. 3, 2018

(54) SYSTEM AND METHOD FOR WORK VEHICLE OPERATOR IDENTIFICATION

(71) Applicant: Deere & Company, Moline, IL (US)

(72) Inventors: Keith N. Chaston, Dubuque, IA (US); Eric S. Crawford, Champaign, IL (US); Joshua D. Hoffman, Davenport, IA (US); Mark J. Cherney, Potosi, WI (US)

(73) Assignee: Deere & Company, Moline, IL (US)

( * ) Notice: Subject to any disclaimer, the term of this patent is extended or adjusted under 35 U.S.C. 154(b) by 46 days.

(21) Appl. No.: 15/009,263

(22) Filed: Jan. 28, 2016

(65) Prior Publication Data

US 2017/0217444 A1 Aug. 3, 2017

(51) Int. Cl.
*B60W 50/08* (2012.01)
*H04W 4/00* (2018.01)
*H04W 4/12* (2009.01)
*B60R 25/04* (2013.01)
*B60R 25/24* (2013.01)
*H04L 29/06* (2006.01)
*H04W 12/06* (2009.01)
(Continued)

(52) U.S. Cl.
CPC ............. *B60W 50/08* (2013.01); *B60R 25/04* (2013.01); *B60R 25/24* (2013.01); *H04L 63/107* (2013.01); *H04L 67/12* (2013.01); *H04W 4/008* (2013.01); *H04W 4/12* (2013.01); *H04W 12/06* (2013.01); *B60W 2050/0043* (2013.01); *B60W 2540/28* (2013.01)

(58) Field of Classification Search
CPC . B60R 25/04; B60R 2025/0405; B60R 25/24; G07C 2209/04; B60W 50/082; B60W 2540/28; H04W 12/08
See application file for complete search history.

(56) References Cited

U.S. PATENT DOCUMENTS 6,611,755 B1 * 8/2003 Coffee .................... B28C 5/422
340/438
6,952,156 B2 * 10/2005 Arshad .................. B60R 25/04
340/5.2
9,354,627 B2 5/2016 Takemoto et al.
(Continued)

FOREIGN PATENT DOCUMENTS

CN 103310316 A 9/2013

OTHER PUBLICATIONS

Apple, Getting Started with iBeacon Version 1.0, Product Manual, Jun. 2, 2014.
(Continued)

*Primary Examiner* — Thomas Alunkal
(74) *Attorney, Agent, or Firm* — Lorenz & Kopf, LLP

(57) ABSTRACT

An operator identification control system and method are disclosed for a work vehicle having a cab, a work tool and a source of propulsion. The operator identification control system includes a source associated with the operator that actively transmits an operator identification to identify the operator. The operator identification control system also includes at least one controller onboard the work vehicle that receives and processes the operator identification to determine whether the operator is associated with the work vehicle, and based on the determination, enables an operation of the work tool and/or a motion of the work vehicle by the operator.

14 Claims, 7 Drawing Sheets

(51) Int. Cl.
*H04L 29/08* (2006.01)
*B60W 50/00* (2006.01)

(56) References Cited

U.S. PATENT DOCUMENTS

| | | | |
|---|---|---|---|
| 9,635,518 B2 * | 4/2017 | Lee | H04W 4/046 |
| 2008/0073090 A1 * | 3/2008 | Harris | E01H 5/06 |
| | | | 172/275 |
| 2010/0063652 A1 | 3/2010 | Anderson | |
| 2011/0144844 A1 * | 6/2011 | Ishibashi | B60L 11/1846 |
| | | | 701/22 |
| 2012/0010774 A1 | 1/2012 | McQuade et al. | |
| 2012/0164989 A1 * | 6/2012 | Xiao | G07C 5/008 |
| | | | 455/414.1 |
| 2012/0206255 A1 * | 8/2012 | Morris | B60R 16/0232 |
| | | | 340/439 |
| 2014/0121952 A1 * | 5/2014 | Fujimoto | B60K 37/06 |
| | | | 701/113 |
| 2014/0188309 A1 * | 7/2014 | Caratto | B60R 25/00 |
| | | | 701/2 |

OTHER PUBLICATIONS

Estimote, Inc., Estimote Beacons—Real World Context for Your Apps, Product Web Page, Admitted Prior Art.

* cited by examiner

SYSTEM AND METHOD FOR WORK VEHICLE OPERATOR IDENTIFICATION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and to an identification of an operator of a respective work vehicle.

BACKGROUND OF THE DISCLOSURE

In the construction industry, various work vehicles are operated to perform various tasks at a work site. For example, an articulated dump truck may be utilized to haul loads of material over rough terrain. Given the nature of the work site, many work vehicles, including the articulated dump truck, do not utilize a key based ignition system.

In certain examples, the work vehicle may be operated or started upon entry into a cab of the work vehicle. By enabling the operation or starting of the work vehicle upon entry into the cab, the work vehicle may be vulnerable to unauthorized use. Moreover, in certain instances it may be desirable to track the use of the work vehicle by a particular operator such that operator specific usage data may be gathered.

SUMMARY OF THE DISCLOSURE

The disclosure provides a system and method for identifying an operator of a work vehicle.

In one aspect the disclosure provides an operator identification control system for a work vehicle having a cab, a work tool and a source of propulsion. The operator identification control system includes a source associated with the operator that actively transmits an operator identification to identify the operator. The operator identification control system also includes at least one controller onboard the work vehicle that receives and processes the operator identification to determine whether the operator is associated with the work vehicle, and based on the determination, enables at least one of an operation of the work tool and a motion of the work vehicle by the operator.

In another aspect the disclosure provides an operator identification control method for a work vehicle having a cab, a work tool and a source of propulsion. The method includes actively transmitting a machine identification in the cab of the work vehicle; and receiving, by at least one controller of the work vehicle, an operator identification that identifies an operator based on the machine identification. The method further includes processing, by the at least one controller, the operator identification to determine whether the operator is associated with the work vehicle; and enabling an operation of the work tool and motion of the work vehicle by the operator based on the determination.

In yet another aspect the disclosure provides an operator identification control system for a work vehicle having a cab, a work tool and a source of propulsion. The operator identification control system includes a source that actively transmits a machine identification disposed in the cab of the work vehicle. The operator identification control system includes an operator device having a controller that receives and processes the machine identification and based on the received machine identification, generates an operator identification that identifies an operator. The operator identification control system includes at least one controller onboard the work vehicle that receives and processes the operator identification to determine whether the operator is associated with the work vehicle, and based on the determination, enables an operation of the work tool and enables a motion of the work vehicle by the operator.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
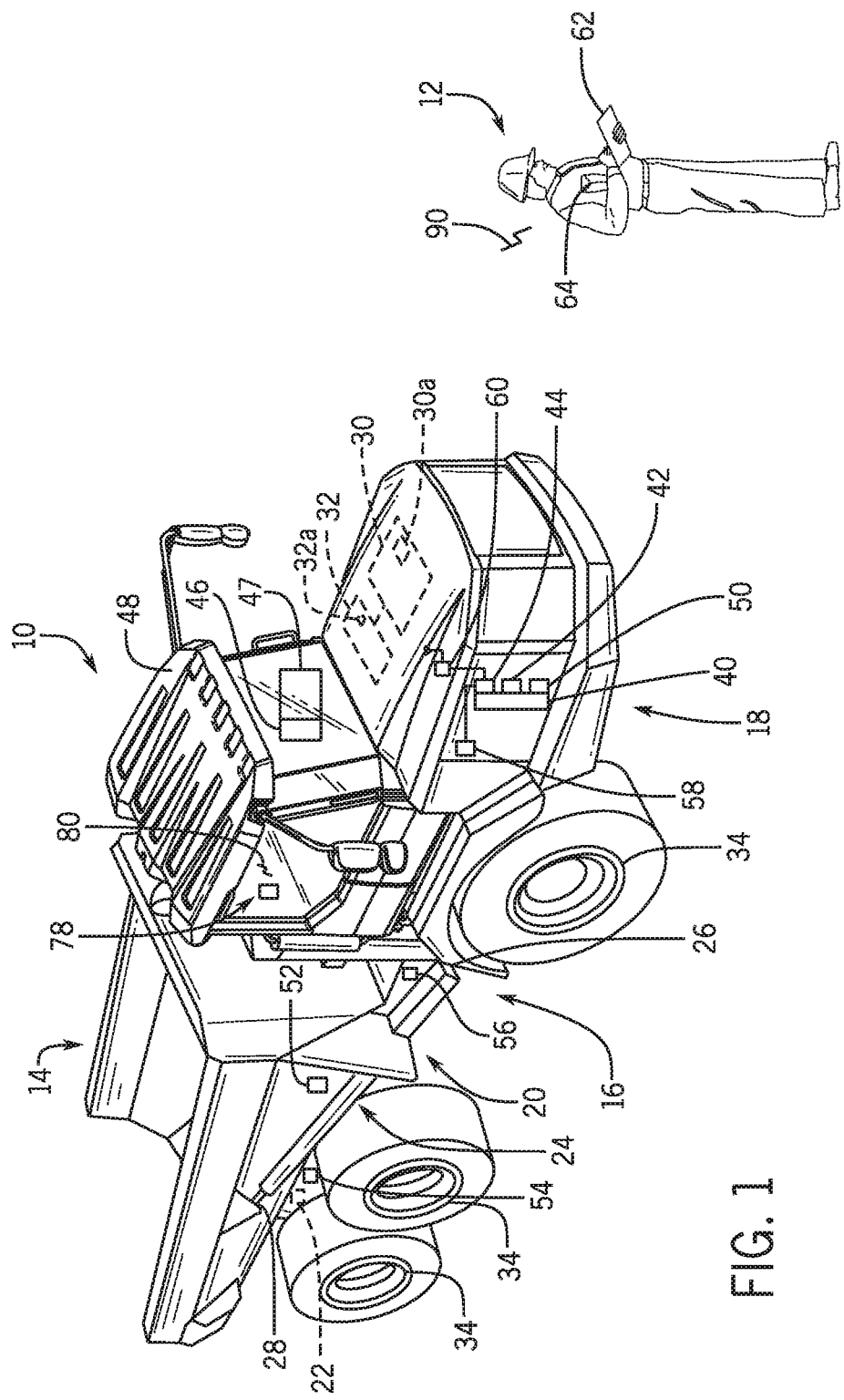
FIG. 1 is a perspective view of an example work vehicle in the form of an articulated dump truck in which the disclosed operator identification control system and method may be used.

The following describes one or more example embodiments of the disclosed system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles, and that the articulated dump truck described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed system for operator identification that includes controlling the operation of the work vehicle based on the operator identification, as shown in the accompanying figures of the drawings described briefly above. Generally, the disclosed control systems (and work vehicles in which they are implemented) provide for improved operator identification as compared to conventional systems by requiring a unique operator identifier to be received and verified by a controller of the work vehicle before enabling a motion of the work vehicle, such as an enable a start-up of an engine or enabling a selection of a range of a transmission to a range other than a park range, and enabling an operation of a work tool of the work vehicle. By requiring a unique identifier prior to enabling a motion of the work vehicle and enabling an operation of the work tool, the work vehicle is less vulnerable to unauthorized use. Moreover, data regarding the usage of the work vehicle by a particular operator may be stored by the control system. This may enable an owner of the work vehicle to evaluate an operator's efficiency, for example, during the usage of the work vehicle, and/or to determine whether the operator is using the work vehicle appropriately.

Discussion herein may sometimes focus on the example application of an operator identification control system for an articulated dump truck. In other applications, other configurations are also possible. For example, work vehicles in some embodiments may be configured as haulers or loaders, such as tractor loaders, crawler loaders or similar machines. Further, work vehicles may be configured as machines other than construction vehicles, including machines from the agriculture, forestry and mining industries, such as tractors, combines, harvesters, feller bunchers, and so on. Thus, the configuration of the operator identification control system for use in an articulated dump truck is merely an example.

Generally, the disclosed control system receives an operator identification that uniquely identifies the operator of the work vehicle. In one example, the operator identification comprises an operator identification signal actively transmitted by an operator identification beacon associated with or coupled to the operator. In another example, the operator identification comprises operator identification data transmitted over a wireless communication protocol from a portable electronic device associated with the operator. In this example, the portable electronic device receives and processes a machine identification signal generated and transmitted by a machine identification beacon, and generates and transmits the operator identification data based on the receipt of the machine identification signal.

Based on the receipt of the operator identification, the control system queries a local data store (i.e. a data store onboard the work vehicle) to determine whether the operator identified in the operator identification data is associated with or listed in the data store as an operator of the work vehicle. If the control system determines the operator identification received matches an operator listed in the local data store, the control system enables an operation of a work tool associated with the work vehicle and enables a motion of the work vehicle by the operator. If, however, the operator is not found in the local data store, the control system flags an error and does not enable the operation of the work tool and does not enable motion or movement of the work vehicle. In certain examples, the control system may also output an error notification to a cab of the work vehicle that indicates that the operator is unknown to the work vehicle.

In addition, once the operator has been verified as being associated with the work vehicle (such that the operator is listed in the local data store), the control system generates and transmits usage data regarding the use of the work vehicle by the identified operator to a remote system. The control system may transmit the usage data to the remote system over a suitable wireless communication protocol. In one example, the control system transmits the usage data based on a notification that the operator is no longer within proximity of the vehicle. For example, if the operator identification signal is no longer received by the control system. As a further example, a notification may be received from the portable electronic device of the operator that the machine identification signal is no longer being received by the portable electronic device. In certain embodiments, the control system also outputs a shutdown command to the source of propulsion based on the received notification.

As noted above, the disclosed operator identification control system and method may be utilized with regard to various work vehicles, including articulated dump trucks, loaders, graders, tractors, combines, etc. Referring to FIG. 1, in some embodiments, the disclosed operator identification system may be used with a work vehicle 10, such as an articulated dump truck (ADT), to identify an operator 12 of the work vehicle 10. In this example, the work vehicle 10 includes a work tool, such as a load bin 14, mounted to a vehicle frame 16. It will be understood that the configuration of the work vehicle 10 having a work tool as the load bin 14 is presented as an example only.

In the embodiment depicted, the vehicle frame 16 includes a first, front frame portion 18 and a second, rear frame portion 20, which are coupled together via an articulation joint (not shown) to enable pivotal movement between the front frame portion 18 and the rear frame portion 20. The load bin 14 is mounted to the rear frame portion 20 via coupling pins 22 that define a pivot point for the load bin 14. The load bin 14 defines a receptacle to receive a payload.

One or more hydraulic cylinders 24 are mounted to the rear frame portion 20 and to the load bin 14, such that the hydraulic cylinders 24 may be driven or actuated in order to pivot the load bin 14 about the coupling pins 22. Generally, the work vehicle 10 includes two hydraulic cylinders 24, one on a left side of the load bin 14 and one on a right side of the load bin 14 in a forward driving direction of the work vehicle 10. It should be noted, however, that the work vehicle 10 may have any number of hydraulic cylinders, such as one, three, etc. Each of the hydraulic cylinders 24 includes an end mounted to the rear frame portion 20 at a pin 26 and an end mounted to the load bin 14 at a pin 28. Upon activation of the hydraulic cylinders 24, the load bin 14 may be moved from a lowered, loaded position L (FIG. 1) to a raised, unloaded position R (not shown) to dump a payload contained within the load bin 14.

Thus, in the embodiment depicted, the load bin 14 is pivotable vertically relative to a horizontal axis by the one or more hydraulic cylinders 24. In other configurations, other movements of a load bin may be possible. Further, in some embodiments, a different number or configuration of hydraulic cylinders or other actuators may be used. Thus, it will be understood that the configuration of the load bin 14 is presented as an example only. In this regard, a load bin (e.g., the load bin 14) may be generally viewed as a receptacle that is pivotally attached to a vehicle frame. Similarly, a coupling pin (e.g., the coupling pins 22) may be generally viewed as a pin or similar feature effecting pivotal attachment of a load bin to a vehicle frame. In this light, a tilt actuator (e.g., the hydraulic cylinders 24) may be generally viewed as an actuator for pivoting a receptacle with respect to a vehicle frame.

The work vehicle 10 includes a source of propulsion, such as an engine 30. The engine 30 supplies power to a transmission 32. In one example, the engine 30 is an internal combustion engine, such as a diesel engine, that is controlled by an engine control module 30a. As will be discussed further herein, the engine control module 30a receives one or more control signals or control commands from a controller 44 to enable motion of the work vehicle 10 by enabling a start-up of the engine 30. The engine control module 30a also receives one or more control signals or control commands from the controller 44 to enable a shut-down of the engine 30. It should be noted that the use of an internal combustion engine is merely an example, as the propulsion device can be a fuel cell, an electric motor, a hybrid-gas electric motor, etc., which is responsive to one or more control signals from the controller 44 to enable a start-up or a shutdown of the propulsion device.

The transmission 32 transfers the power from the engine 30 to a suitable driveline coupled to one or more driven wheels 34 (and tires) of the work vehicle 10 to enable the work vehicle 10 to move. As is known to one skilled in the art, the transmission 32 can include a suitable gear transmission, which can be operated in a variety of ranges containing one or more gears, including, but not limited to a park range, a neutral range, a reverse range, a drive range, a low range, etc. In one example, the transmission 32 is controlled by a transmission control module 32a. As will be discussed further herein, the transmission control module 32a receives one or more control signals or control commands from the controller 44 to enable motion of the work vehicle 10, by allowing the transmission to shift into out of a park range, for example.

The work vehicle 10 also includes one or more pumps 40, which may be driven by the engine 30 of the work vehicle 10. Flow from the pumps 40 may be routed through various control valves 42 and various conduits (e.g., flexible hoses) in order to drive the hydraulic cylinders 24. Flow from the pumps 40 may also power various other components of the work vehicle 10. The flow from the pumps 40 may be controlled in various ways (e.g., through control of the various control valves 42), in order to cause movement of the hydraulic cylinders 24, and thus, movement of the work tool or the load bin 14 relative to the vehicle frame 16. In this way, for example, a movement of the load bin 14 between the lowered, loaded position L and the raised, unloaded position R may be implemented by various control signals to the pumps 40, control valves 42, and so on.

Generally, the controller 44 (or multiple controllers) may be provided, for control of various aspects of the operation of the work vehicle 10, in general. The controller 44 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 44 may be configured to execute various computational and control functionality with respect to the work vehicle 10 (or other machinery). In some embodiments, the controller 44 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 44 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 44 may be in electronic, hydraulic, mechanical, or other communication with various other systems or devices of the work vehicle 10 (or other machinery). For example, the controller 44 may be in electronic or hydraulic communication with various actuators, sensors, and other devices within (or outside of) the work vehicle 10, including various devices associated with the pumps 40, control valves 42, and so on. The controller 44 may communicate with other systems or devices (including other controllers) in various known ways, including via a CAN bus (not shown) of the work vehicle 10, via wireless or hydraulic communication means, or otherwise. An example location for the controller 44 is depicted in FIG. 1. It will be understood, however, that other locations are possible including other locations on the work vehicle 10, or various remote locations.

In some embodiments, the controller 44 may be configured to receive input commands and to interface with an operator via a human-machine interface 46, which may be disposed inside a cab 48 of the work vehicle 10 for easy access by the operator. The human-machine interface 46 may be configured in a variety of ways. In some embodiments, the human-machine interface 46 may include an input device 45 comprising one or more joysticks, various switches or levers, one or more buttons, a touchscreen interface that may be overlaid on a display 47, a keyboard, a speaker, a microphone associated with a speech recognition system, or various other human-machine interface devices. The human-machine interface 46 also includes the display 47, which can be implemented as a flat panel display or other display type that is integrated with an instrument panel or console of the work vehicle 10. Those skilled in the art may realize other techniques to implement the display 47 in the work vehicle 10. The display 47 comprises any suitable technology for displaying information, including, but not limited to, a liquid crystal display (LCD), organic light emitting diode (OLED), plasma, or a cathode ray tube (CRT).

Various sensors may also be provided to observe various conditions associated with the work vehicle 10. In some embodiments, various sensors 50 (e.g., pressure, flow or other sensors) may be disposed near the pumps 40 and control valves 42, or elsewhere on the work vehicle 10. For example, sensors 50 may include one or more pressure sensors that observe a pressure within the hydraulic circuit, such as a pressure associated with at least one of the one or more hydraulic cylinders 24. The sensors 50 may also observe a pressure associated with the pumps 40. In some embodiments, various sensors may be disposed near the load bin 14. For example, sensors 52 (e.g. load sensors) may be disposed on or coupled near the load bin 14 in order to measure parameters including the load in the load bin 14 and so on.

Various sensors 54 may also be disposed on or near the rear frame portion 20 in order to measure parameters, such as an incline or slope of the rear frame portion 20, and so on. In some embodiments, the sensors 54 may include an inclinometer coupled to or near the rear frame portion 20, etc. In certain embodiments, the sensors 54 may be microelectromechanical sensors (MEMS) that observe a force of gravity and an acceleration associated with the work vehicle 10. In addition, various sensors 56 are disposed near the rear frame portion 20 in order to observe an orientation of the load bin 14 relative to the rear frame portion 20. In some embodiments, the sensors 56 include angular position sensors coupled between the rear frame portion 20 and the load bin 14 in order to detect the angular orientation of the load bin 14 relative to the rear frame portion 20.

The various components noted above (or others) may be utilized to control movement of the load bin 14 via control of the movement of the one or more hydraulic cylinders 24. Each of the sensors 50, 52, 54 and 56 may be in communication with the controller 44 via a suitable communication architecture, such as the CAN bus associated with the work vehicle 10. The work vehicle 10 may also include a clock 58, which provides a time of day and a date in order to inform the operator identification control system and method described herein. It should be noted that the time of day and the date may also be received from a global positioning system (GPS; not shown) associated with the work vehicle 10.

The work vehicle 10 includes a vehicle communication component 60. The vehicle communication component 60 enables communication between the controller 44 and a portable electronic device 62 and/or an operator identification beacon 64, each of which are associated with the operator 12. In certain examples, the portable electronic device 62 and the operator identification beacon 64 each comprise a source associated with the operator 12 that actively transmits an operator identification to identify the operator to the controller 44. The vehicle communication component 60 comprises any suitable system for receiving data from and transmitting data to the portable electronic device 62 and receiving data from the operator identification beacon 64. For example, the vehicle communication component 60 may include a radio configured to receive data transmitted by modulating a radio frequency (RF) signal from a remote station (not shown) as is well known to those skilled in the art. For example, the remote station (not shown) may be part of a cellular telephone network and the data may be transmitted according to the long-term evolution (LTE) standard. The vehicle communication component 60 also transmits data to the remote station (not shown) to achieve bi-directional communications. However, other techniques for transmitting and receiving data may alternately be utilized. In one example, the vehicle communication component 60 achieves bi-directional communications with the portable electronic device 62 over Bluetooth®, satellite or by utilizing a Wi-Fi standard, i.e., one or more of the 802.11 standards as defined by the Institute of Electrical and Electronics Engineers ("IEEE"), as is well known to those skilled in the art. Thus, the vehicle communication component 60 comprises a Bluetooth® transceiver, a satellite transceiver, a radio transceiver, a cellular transceiver, an LTE transceiver and/or a Wi-Fi transceiver. With regard to the operator identification beacon 64, in one example, the vehicle communication component 60 communicates with the operator identification beacon 64 over Bluetooth®, such as Bluetooth® low energy (LE or BLE) or Bluetooth® Smart. In certain examples, the vehicle communication component 60 communicates with the portable electronic device 62 over a wireless communication protocol, including, but not limited to, radio, LTE standard, Wi-Fi standard, etc.

In certain embodiments, the vehicle communication component 60 may be configured to encode data or generate encoded data. The encoded data generated by the vehicle communication component 60 may be encrypted. A security key may be utilized to decrypt and decode the encoded data, as is appreciated by those skilled in the art. The security key may be a "password" or other arrangement of data that permits the encoded data to be decrypted. Alternatively, the remote station (not shown) may implement security protocols to ensure that communication takes place between the appropriate work vehicle 10 and portable electronic device 62.

As will be discussed, the portable electronic device 62 may provide a source of operator identification data that is actively transmitted by the portable electronic device 62 to the controller 44. In one example, the portable electronic device 62 is in communication with the work vehicle 10 to transmit data to the vehicle communication component 60 associated with the work vehicle 10 and to receive the data from the vehicle communication component 60. The portable electronic device 62 is any suitable nomadic electronic device discrete or separate from the work vehicle 10, including, but not limited to, a hand-held portable electronic device, such as a tablet computing device, mobile or smart cellular phone, personal digital assistant, a laptop computing device, etc.

Figure 2:
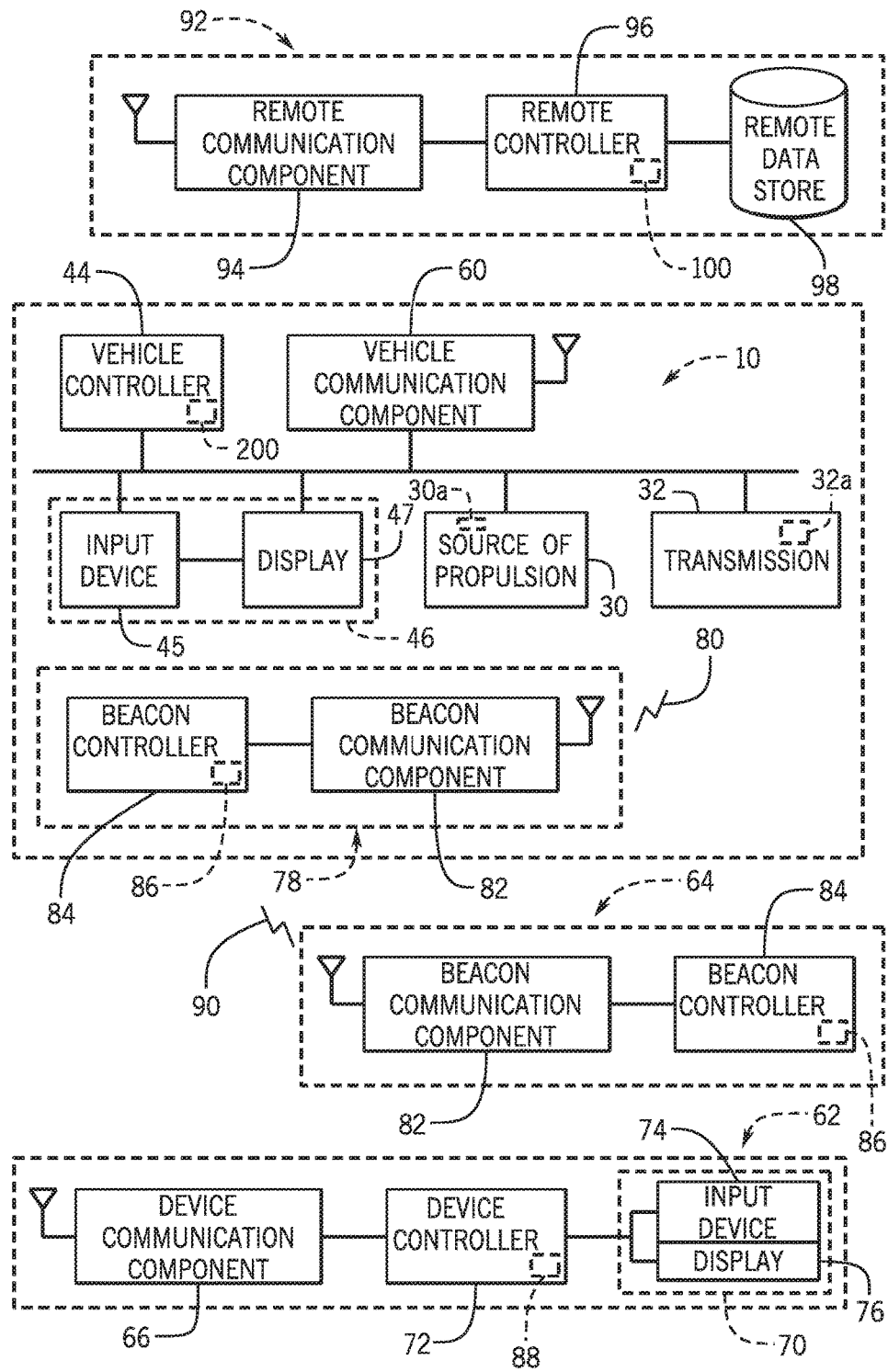
FIG. 2 is a schematic block diagram illustrating an example operator identification control system.

With reference to FIG. 2, the portable electronic device 62 includes a device communication component 66, a device user interface 70 and a device controller 72. The device communication component 66 comprises any suitable system for receiving data from and transmitting data to the vehicle communication component 60. For example, the device communication component 66 may include a radio configured to receive data transmitted by modulating a radio frequency (RF) signal from a remote station (not shown) as is well known to those skilled in the art. For example, the remote station (not shown) may be part of a cellular telephone network and the data may be transmitted according to the long-term evolution (LTE) standard. The device communication component 66 also transmits data to the remote station (not shown) to achieve bi-directional communications. However, other techniques for transmitting and receiving data may alternately be utilized. For example, the device communication component 66 may achieve bi-directional communications with the vehicle communication component 60 over Bluetooth® or by utilizing a Wi-Fi standard, i.e., one or more of the 802.11 standards as defined by the Institute of Electrical and Electronics Engineers ("IEEE"), as is well known to those skilled in the art. Thus, the device communication component 66 comprises a Bluetooth® transceiver, a radio transceiver, a cellular transceiver, an LTE transceiver and/or a Wi-Fi transceiver.

The device communication component 66 may also be configured to encode data or generate encoded data. The encoded data generated by the device communication component 66 may be encrypted. A security key may be utilized to decrypt and decode the encoded data, as is appreciated by those skilled in the art. The security key may be a "password" or other arrangement of data that permits the encoded data to be decrypted.

In certain embodiments, the device communication component 66 is also configured to communicate with a machine identification beacon 78 coupled to the work vehicle 10. In one example, the machine identification beacon 78 comprises an iBeacon-compatible hardware transmitter; however, the machine identification beacon 78 may comprise any suitable active transmitter. In this example, the machine identification beacon 78 comprises a Bluetooth® transmitter and the device communication component 66 communicates with the machine identification beacon 78 over Bluetooth®, such as Bluetooth® low energy (LE or BLE) or Bluetooth® Smart. It should be noted that the use of Bluetooth® is merely exemplary, as any suitable communication protocol may be employed, such as a Wi-Fi standard. The machine identification beacon 78 actively transmits a unique machine identification signal 80 over the communication protocol, in this example Bluetooth®, which is received by the device communication component 66. In the context of this disclosure "actively transmits" is used to denote the substantially continuous transmission of the machine identification signal 80 by a beacon communication component 82. Stated another way, the machine identification beacon 78 substantially continuously generates the machine identification signal 80 and substantially continuously broadcasts or transmits the machine identification signal 80 with the beacon communication component 82 over a life of the machine identification beacon 78 (1-way transmitter). Thus, as the machine identification signal 80 is substantially continuously transmitted by the machine identification beacon 78, the device communication component 66 receives the machine identification signal 80 when the portable electronic device 62 is in proximity to the machine identification beacon 78.

In the example of the machine identification signal 80 broadcast via Bluetooth®, the device communication component 66 receives the machine identification signal 80 within a pre-defined or pre-set range of the beacon communication component 82. In one example, the pre-defined or pre-set range is about 5 feet; however, the pre-defined or pre-set range may be about 10 feet, depending upon the work vehicle. Moreover, the range of the beacon communication component 82 may be adjusted to account for shielding of the machine identification signal 80 by the structure of the work vehicle 10. For example, with brief reference to FIG. 1, the machine identification beacon 78 is coupled to the cab 48 of the work vehicle 10, and thus, the doors of the cab 48 may interfere with or block the transmission of the machine identification signal 80 by the beacon communication component 82. It should be noted that the location of the machine identification beacon 78 within the cab 48 is merely exemplary, as the machine identification beacon 78 may be coupled to the work vehicle 10 at any desired location.

With reference to FIG. 2, the machine identification beacon 78 also generally includes a beacon controller 84. The beacon controller 84 may be configured as a computing device with associated processor devices and memory architectures, as a hard-wired computing circuit (or circuits), as a programmable circuit, or otherwise. The beacon controller 84 is in communication with the beacon communication component 82, and includes a control module 86 embedded within the beacon controller 84. The control module 86 generates the unique machine identification signal 80, and is programmed to command the beacon communication component 82 to continuously broadcast the machine identification signal 80. In the example of an iBeacon, the control module 86 may be factory set with a pre-defined universally unique identifier, which is received by the device communication component 66 of the portable electronic device 62 and from which the device controller 72 of the portable electronic device 62 determines the particular work vehicle (work vehicle 10) associated with the machine identification beacon 78.

It will be understood that other configurations may also be possible. For example, in certain embodiments, the portable electronic device 62 may be coupled directly to the work vehicle 10 via a docking station (not shown) disposed within the cab 48 of the work vehicle 10 (FIG. 1). The docking station may be in wired or wireless communication with the controller 44 to enable the operator identification data from the portable electronic device 62 to be transmitted directly to the controller 44. Thus, the docking station may comprise a suitable interface, such as USB, microUSB, Apple® Lightning™, etc. that cooperates with an interface associated with the portable electronic device 62 to enable data transfer from the portable electronic device 62 to the controller 44.

The device user interface 70 allows the user of the portable electronic device 62 to interface with the portable electronic device 62 (e.g. to input commands and data). In one example, the device user interface 70 includes an input device 74 and a display 76. The input device 74 is any suitable device capable of receiving user input, including, but not limited to, a keyboard, a microphone, a touchscreen layer associated with the display 76, or other suitable device to receive data and/or commands from the user. Of course, multiple input devices 74 can also be utilized. The display 76 comprises any suitable technology for displaying information, including, but not limited to, a liquid crystal display (LCD), organic light emitting diode (OLED), plasma, or a cathode ray tube (CRT).

The device controller 72 is in communication with the device communication component 66 and the device user interface 70 over a suitable interconnection architecture or arrangement that facilitates transfer of data, commands, power, etc. The device controller 72 may be configured as a computing device with associated processor devices and memory architectures, as a hard-wired computing circuit (or circuits), as a programmable circuit, or otherwise. The device controller 72 includes a device control module 88 embedded within the device controller 72, which receives input from the device user interface 70 and sets data, such as owner identification data, for transmission by the device communication component 66 to the work vehicle 10 based on the input from the device user interface 70 and the machine identification signal 80. The device control module 88 may also receive data from the device communication component 66 and set this data as output for display on the display 76 of the device user interface 70. Thus, the device control module 88 enables two way data transfer with the work vehicle 10.

In certain embodiments, an operator identification beacon 64 may be in communication with the vehicle communication component 60. The operator identification beacon 64 may be substantially similar to the machine identification beacon 78. Generally, the operator identification beacon 64 is coupled to the operator 12 (FIG. 1). In one example, the operator identification beacon 64 comprises an iBeacon-compatible hardware transmitter; however, the operator identification beacon 64 may comprise any suitable active transmitter. In this example, the operator identification beacon 64 comprises a Bluetooth® transmitter and the vehicle communication component 60 communicates with the operator identification beacon 64 over Bluetooth®, such as Bluetooth® low energy (LE or BLE) or Bluetooth® Smart. It should be noted that the use of Bluetooth® is merely exemplary, as any suitable communication protocol may be employed, such as a Wi-Fi standard. The operator identification beacon 64 actively transmits a unique operator identification signal 90 via the beacon communication component 82 over the communication protocol, in this example Bluetooth®, which is received by the vehicle communication component 60. As the operator identification signal 90 is substantially continuously transmitted by the operator identification beacon 64, the vehicle communication component 60 receives the operator identification signal 90 when the operator identification beacon 64 is in proximity to the vehicle communication component 60, and thus, the work vehicle 10.

In the example of the operator identification signal 90 broadcast via Bluetooth®, the vehicle communication component 60 receives the operator identification signal 90 within a pre-defined or pre-set range of the beacon communication component 82. In one example, the pre-defined or pre-set range is about 5 feet; however, the pre-defined or pre-set range may be about 10 feet, depending upon the work vehicle. Moreover, the range of the beacon communication component 82 may be adjusted to account for shielding of the operator identification signal 90 by the structure of the work vehicle 10.

The operator identification beacon 64 also generally includes the beacon controller 84. The beacon controller 84 is in communication with the beacon communication component 82, and includes the control module 86 embedded within the beacon controller 84. The control module 86 generates the unique operator identification signal 90, and is programmed to command the beacon communication component 82 to substantially continuously broadcast the operator identification signal 90. In the example of an iBeacon, the control module 86 may be factory set with a pre-defined universally unique identifier, which is received by the vehicle communication component 60 of the work vehicle 10 and based on the universally unique identifier, the controller 44 determines the particular operator 12 associated with the operator identification beacon 64.

In certain embodiments, the vehicle communication component 60 is in communication with a remote station or system 92. In one example, the remote system 92 comprises the JDLink™ system commercially available from Deere & Company of Moline, Ill. The remote system 92 includes a remote communication component 94, a remote controller 96 and one or more remote data stores 98. The remote communication component 94 comprises any suitable system for receiving data from and transmitting data to the vehicle communication component 60. For example, the remote communication component 94 may include a radio configured to receive data transmitted by modulating a radio frequency (RF) signal from a remote station (not shown) as is well known to those skilled in the art. For example, the remote station (not shown) may be part of a cellular telephone network and the data may be transmitted according to the long-term evolution (LTE) standard. The remote communication component 94 also transmits data to the remote station (not shown) to achieve bi-directional communications. However, other techniques for transmitting and receiving data may alternately be utilized. For example, the remote communication component 94 may achieve bi-directional communications with the vehicle communication component 60 over Bluetooth®, satellite, or by utilizing a Wi-Fi standard, i.e., one or more of the 802.11 standards as defined by the Institute of Electrical and Electronics Engineers ("IEEE"), as is known to those skilled in the art. Thus, the remote communication component 94 comprises a Bluetooth® transceiver, a radio transceiver, a cellular transceiver, a satellite transceiver, an LTE transceiver and/or a Wi-Fi transceiver.

The remote communication component 94 may also be configured to encode data or generate encoded data. The encoded data generated by the remote communication component 94 may be encrypted. A security key may be utilized to decrypt and decode the encoded data, as is appreciated by those skilled in the art. The security key may be a "password" or other arrangement of data that permits the encoded data to be decrypted.

The remote controller 96 is in communication with the remote communication component 94 and the one or more remote data stores 98 over a suitable interconnection architecture or arrangement that facilitates transfer of data, commands, power, etc. The remote controller 96 may also be in communication with one or more remote users via a portal, such as a web-based portal. The remote controller 96 may be configured as a computing device with associated processor devices and memory architectures, as a hard-wired computing circuit (or circuits), as a programmable circuit, or otherwise. The remote controller 96 includes a remote control module 100 embedded within the remote controller 96, which receives data communicated from the work vehicle 10 and sets data, such as usage data for a particular operator, for one or more of the remote data stores 98. In one example, at least one of the one or more remote data stores 98 stores data, such as the usage data of the work vehicle 10 for a particular operator. The usage data of the work vehicle 10 for the particular operator may be stored in any desired format, and may comprise one or more tables. The tables may be indexed by operator name, machine name, etc. to enable retrieval of the usage data upon a request received from a remote user in communication with the remote controller 96 via the web-based portal.

In various embodiments, the controller 44 of the work vehicle 10 outputs one or more control signals or control commands to the engine control module 30a to enable motion of the work vehicle 10 by enabling a start-up of the engine 30 and/or outputs one or more control signals or control commands to the transmission control module 32a to enable motion of the work vehicle 10 by enabling a selection of a gear other than the park range based on communications received from the portable electronic device 62 and/or operator identification beacon 64, input received from the human-machine interface 46, and further based on the operator identification control system and method of the present disclosure. The controller 44 of the work vehicle 10 outputs one or more control signals or control commands to the pumps 40 and/or control valves 42 to enable the hydraulic cylinders 24 to be driven to enable an operation of the work tool based on communications received from the portable electronic device 62 and/or operator identification beacon 64, input received from the human-machine interface 46, and further based on the operator identification control system and method of the present disclosure. The controller 44 outputs the one or more control signals or control commands to the engine control module 30a to shutdown the engine 30 based on communications received from the portable electronic device 62 and/or operator identification beacon 64, input received from the human-machine interface 46, and further based on the operator identification control system and method of the present disclosure. The controller 44 also outputs one or more commands to the vehicle communication component 60 to transmit usage data regarding the work vehicle 10 for the particular operator to the remote system 92 based on communications received from the portable electronic device 62 and/or operator identification beacon 64, and further based on the operator identification control system and method of the present disclosure.

Figure 3:
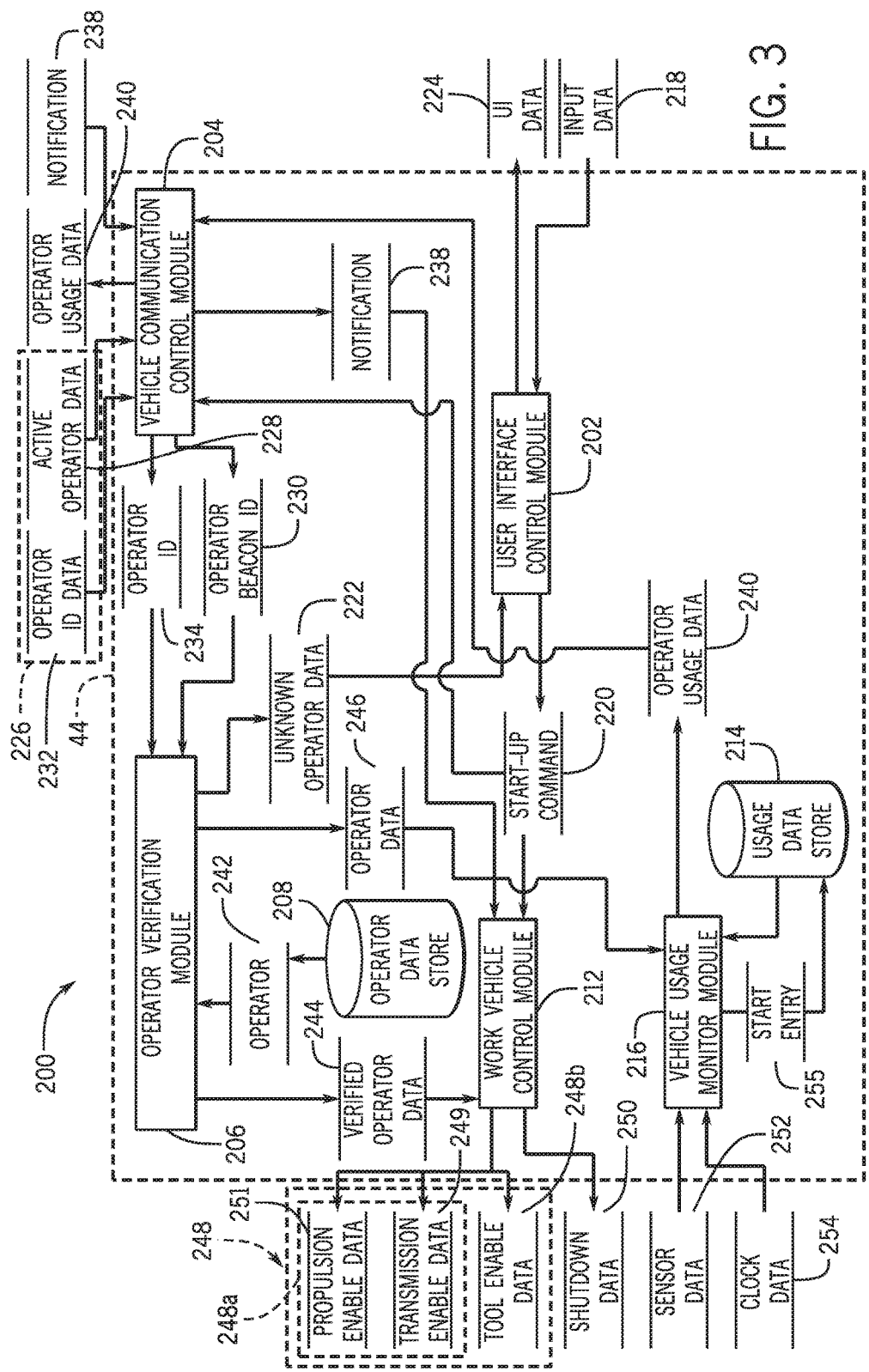
FIG. 3 is a dataflow diagram illustrating an example operator identification control system for the work vehicle in accordance with various embodiments.

Referring now also to FIG. 3, and with continuing reference to FIGS. 1 and 2, a dataflow diagram illustrates various embodiments of an operator identification control system 200 for the work vehicle 10, which may be embedded within the controller 44. Various embodiments of the operator identification control system 200 according to the present disclosure can include any number of sub-modules embedded within the controller 44. As can be appreciated, the sub-modules shown in FIG. 3 can be combined and/or further partitioned to similarly identify an operator and control the engine 30, the transmission 32 and the work tool or load bin 14. Inputs to the operator identification control system 200 may be received from the sensors 50, 52, 54, 56 (FIG. 1), the human-machine interface 46 (FIG. 1), received from the operator identification beacon 64 (FIG. 1), received from the device communication component 66 (FIG. 2), received from other control modules (not shown) associated with the work vehicle 10, and/or determined/modeled by other sub-modules (not shown) within the controller 44. In various embodiments, the controller 44 includes a user interface (UI) control module 202, an vehicle communications control module 204, an operator verification module 206, an operator data store 208, a work vehicle control module 212, a usage data store 214 and a vehicle usage monitor module 216.

The UI control module 202 receives input data 218 from the human-machine interface 46. In certain embodiments, the input data 218 includes a command to start the engine 30 (i.e. a start-up command for the source of propulsion). The UI control module 202 interprets the input data 218, and sets a start-up command 220 for the vehicle communications control module 204 and the work vehicle control module 212. In one example, the start-up command 220 comprises the command to start the engine 30.

The UI control module 202 also receives as input unknown operator data 222 from the operator verification module 206. The unknown operator data 222 indicates that the operator of the work vehicle 10 is unknown to the controller 44 of the work vehicle 10. Based on the unknown operator data 222, the UI control module 202 outputs user interface data 224. In one example, the user interface data 224 comprises a pop-up graphical user interface or other graphical user interface for display on the display 47 that indicates that the operator is unknown. It should be noted that the output of the user interface data 224 is merely exemplary, as any other technique or device may be used to notify an occupant in the cab 48 of the work vehicle 10 that the operator is unknown to the controller 44, such as an audible message broadcast over a speaker in the cab 48, a warning light disposed in the cab 48, and so on.

The vehicle communications control module 204 receives as input the start-up command 220. Based on the start-up command 220, the vehicle communications control module 204 determines whether operator data 226 has been received from the operator identification beacon 64 and/or the portable electronic device 62. In one example, the vehicle communications control module 204 determines whether active operator data 228 has been received from the operator identification beacon 64. The active operator data 228 comprises the operator identification signal 90, which is actively transmitted by the operator identification beacon 64 and received by the vehicle communication component 60. Based on the receipt of the active operator data 228, the vehicle communications control module 204 interprets the active operator data 228 and sets operator beacon identification data 230 for the operator verification module 206. The operator beacon identification data 230 comprises the universally unique identifier transmitted by the operator identification beacon 64.

In another example, the vehicle communications control module 204 determines whether operator identifier data 232 has been received from the portable electronic device 62. The operator identifier data 232 comprises a unique identification of the operator and an identifier of the portable electronic device 62 generated by the portable electronic device 62 based on the receipt of the machine identification signal 80, as will be discussed further herein. Based on the receipt of the operator identifier data 232, the vehicle communications control module 204 interprets the operator identifier data 232 and sets operator identification data 234 for the operator verification module 206. The operator identification data 234 comprises the unique identification of the operator, which may comprise a name, employee number, badge number and so on.

The vehicle communications control module 204 also receives as input a notification 238 from the portable electronic device 62. The notification 238 indicates that the portable electronic device 62 is no longer in proximity to the machine identification beacon 78 such that the machine identification signal 80 is no longer received by the device communication component 66. Stated another way, the notification 238 indicates that the operator of the work vehicle 10 has likely left the cab 48 of the work vehicle 10 when the machine identification beacon 78 is positioned within the cab 48. Based on receipt of the notification 238, the vehicle communications control module 204 interprets the notification 238 and sets the notification 238 for the work vehicle control module 212 and the vehicle usage monitor module 216.

The vehicle communications control module 204 also receives as input operator usage data 240 from the vehicle usage monitor module 216. The operator usage data 240 comprises data regarding the usage or operation of the work vehicle 10 by the identified operator. For example, the operator usage data 240 may include a length of operation, an average speed of operation, a number of actuations of the hydraulic cylinders 24, a pressure in the hydraulic system, etc. while operated by the particular operator. Based on the receipt of the operator usage data 240, the vehicle communications control module 204 outputs the operator usage data 240. In one example, the vehicle communications control module 204 outputs the operator usage data 240 to the vehicle communication component 60 for transmission to the remote communication component 94 of the remote system 92 to enable the operator usage data 240 to be stored in the remote data store 98 by the remote controller 96.

The operator data store 208 stores one or more tables (e.g., lookup tables) that indicate an authorized operator of the work vehicle 10 associated with a particular operator identifier. In other words, the operator data store 208 stores one or more tables that provide an operator 242 for the work vehicle 10 based on the operator beacon identification data 230 or the operator identification data 234. In one example, the operator 242 comprises a name of an individual that is authorized to operate the work vehicle 10. In other embodiments, the operator 242 may include the name of the individual that is authorized to operate the work vehicle 10, an employee number, a badge number and so on. Thus, the operator data store 208 may store one or more tables that provide the operator 242 based on the universally unique identifier provided by the operator identification beacon 64, and the operator data store 208 may store one or more tables that provide the operator 242 based on the operator identifier provided by the portable electronic device 62. In various embodiments, the tables may comprise lists that are defined by one or more indexes. As an example, one or more tables can be indexed by various parameters such as, but not limited to, the type of operator identifier (e.g. universally unique identifier from the operator identification beacon 64 or the operator identifier from the portable electronic device 62), to provide the operator 242.

In certain embodiments, the operator verification module 206 receives as input the operator beacon identification data 230. Based on the operator beacon identification data 230, the operator verification module 206 queries the operator data store 208 to retrieve the operator 242 that is associated with the operator beacon identification data 230. Based on the retrieval of the operator 242, the operator verification module 206 sets verified operator data 244 as true for the work vehicle control module 212. The verified operator data 244 indicates that the operator of the work vehicle 10 is an authorized operator associated with the work vehicle 10 and that the operator is present in the work vehicle 10. Once an operator 242 has been retrieved, based on the operator beacon identification data 230 no longer being available to the operator verification module 206 such that the active operator data 228 is no longer being received, for example, if the operator has left the work vehicle 10, the operator verification module 206 sets the verified operator data 244 as false to indicate that the operator is no longer in proximity to the work vehicle 10.

Based on the retrieval of the operator 242, the operator verification module 206 also sets operator data 246 for the vehicle usage monitor module 216. In this example, the operator data 246 comprises the name of the operator that has been identified based on the operator beacon identification data 230. In other examples, the operator data 246 may include the name of the operator, the employee number associated with the operator, and so on.

In certain embodiments, the operator verification module 206 receives as input the operator identification data 234. Based on the operator identification data 234, the operator verification module 206 queries the operator data store 208 to retrieve the operator 242 that is associated with the operator identification data 234. Based on the retrieval of the operator 242, the operator verification module 206 sets verified operator data 244 as true for the work vehicle control module 212. Once the operator 242 has been retrieved by the operator verification module 206 based on the operator identification data 234, if the operator identification data 234 is no longer available such that the operator identifier data 232 is not being received, the operator verification module 206 sets the verified operator data 244 as false to indicate that the operator is no longer in proximity to the work vehicle 10.

Based on the retrieval of the operator 242, the operator verification module 206 also sets operator data 246 for the vehicle usage monitor module 216. In this example, the operator data 246 comprises the name of the operator that has been identified based on the operator identification data 234. In other examples, the operator data 246 may include the name of the operator, the employee number associated with the operator, and so on.

If, based on the operator identification data 234 and/or the operator beacon identification data 230, the operator verification module 206 is unable to retrieve the operator 242 from the operator data store 208, the operator verification module 206 sets the unknown operator data 222. Stated another way, if the operator verification module 206 is unable to locate the operator associated with the operator identification data 234 or the operator beacon identification data 230 in the operator data store 208, the operator verification module 206 sets the unknown operator data 222 for the UI control module 202, which indicates that the operator is unknown or not listed within the operator data store 208.

The work vehicle control module 212 receives as input the start-up command 220. Based on the start-up command 220, the work vehicle control module 212 determines whether the verified operator data 244 is true. If the verified operator data 244 is true, the work vehicle control module 212 outputs enable data 248 for the engine control module 30a, the transmission control module 32a and/or the pumps 40 and the control valves 42. In on example, the enable data 248 includes motion enable data 248a and tool enable data 248b. The tool enable data 248b comprises one or more control signals or control commands for the pumps 40 and/or control valves 42 to enable the operation of the work tool, for example, enabling a movement of the load bin 14. The motion enable data 248a enables the motion or movement of the work vehicle 10. In certain examples, the motion enable data 248a comprises transmission enable data 249 and propulsion enable data 251. The transmission enable data 249 comprises one or more control signals for the transmission control module 32a to enable a selection of a range other than the park gear range. Stated another way, the transmission enable data 249 comprises one or more control signals that enable the transmission to be shifted into a range other than the park range, such as the drive range, the low range, and so on, to enable motion of the work vehicle 10. The propulsion enable data 251 comprises one or more control signals for the engine control module 30a to start-up the engine 30.

The work vehicle control module 212 also receives as input the notification 238. Based on receipt of the notification 238, the work vehicle control module 212 sets shutdown data 250 for the engine control module 30a. The shutdown data 250 comprises one or more control signals for the engine control module 30a to shutdown the engine 30. Thus, based on the receipt of the notification 238 that the operator is no longer within the cab 48, one or more control signals are output to the engine control module 30a to shutdown the engine 30.

The usage data store 214 stores usage data regarding the operation of the work vehicle 10. In one example, the usage data store 214 stores one or more entries, which includes data regarding the operation of the work vehicle 10, such as data from the sensors 50, 52, 54, 56, during the operation of the work vehicle 10 by the identified operator. The one or more entries may be indexed by time of day, operator name, employee number, and so on. Thus, the usage data store 214 stores data regarding the operation of the work vehicle 10 by the identified operator, which may be transmitted to the remote system 92.

The vehicle usage monitor module 216 receives as input the verified operator data 244, the operator data 246, sensor data 252 and clock data 254. The sensor data 252 comprises data from the sensors 50, 52, 54, 56, during the operation of the work vehicle 10. The clock data 254 comprises a time of day and a date, which may be received from the clock 58. Based on the receipt of the verified operator data 244 and the operator data 246, the vehicle usage monitor module 216 determines a start time and start date of the usage of the work vehicle 10 and saves the sensor data 252 and the operator identified in the operator data 246 in the usage data store 214 as a start entry 255. Generally, the vehicle usage monitor module 216 continues to store the sensor data 252 until the verified operator data 244 indicates false or that the operator is not verified. Upon the receipt of verified operator data 244 as false, the vehicle usage monitor module 216 stores an end time of day and an end date from the clock data 254 with the collected sensor data 252 for the operator in the usage data store 214. Based on the verified operator data 244 as false, the vehicle usage monitor module 216 also sets the operator usage data 240 for the vehicle communications control module 204. The operator usage data 240 comprises the usage data for the work vehicle 10 as retrieved from the usage data store 214 from the start entry to the indication of the verified operator data 244 as false for the particular operator identified in the operator data 246.

Figure 4:
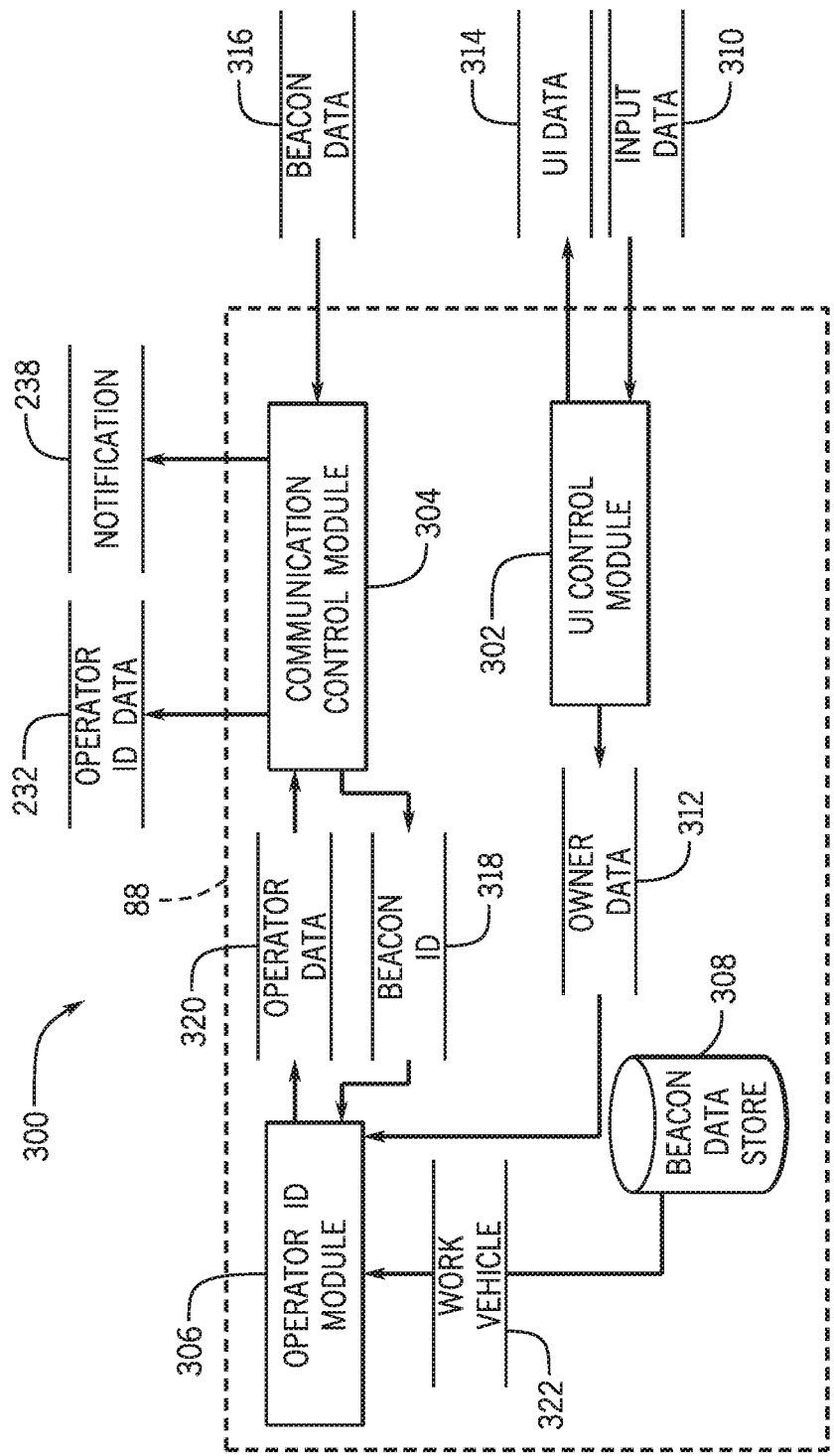
FIG. 4 is a dataflow diagram illustrating an example operator identification control system for a portable electronic device associated with an operator in accordance with various embodiments.

Referring now to FIG. 4, and with continuing reference to FIGS. 1 and 2, a dataflow diagram illustrates various embodiments of an operator identification control system 300, which may be embedded within the device control module 88 of the device controller 72 of the portable electronic device 62. Various embodiments of the operator identification control system 300 according to the present disclosure can include any number of sub-modules embedded within the device controller 72. As can be appreciated, the sub-modules shown in FIG. 4 can be combined and/or further partitioned to similarly identify an operator and transmit operator identifier data 232 to the controller 44 of the work vehicle 10. Inputs to the operator identification control system 300 may be received from the input device 74 of the portable electronic device 62 (FIG. 2), received from the machine identification beacon 78 (FIG. 1), received from other control modules (not shown) associated with the portable electronic device 62, and/or determined/modeled by other sub-modules (not shown) within the portable electronic device 62. In various embodiments, the device control module 88 includes a user interface (UI) control module 302, a communications control module 304, an operator identification module 306 and a beacon data store 308. It will be understood that one or more of the modules associated with the operator identification control system 300 of the device controller 72 may be implemented as an application (i.e. an "app"), which may be downloaded by a user to the portable electronic device 62.

The UI control module 302 receives input data 310 from the input device 74 of the portable electronic device 62. In certain instances, the input data 310 includes an owner name, an employee number or badge number associated with a user or owner of the portable electronic device 62. The UI control module 302 interprets the input data 310, and sets owner data 312 for the operator identification module 306. The owner data 312 may include the name of the owner of the portable electronic device 62, an employee number or badge number associated with a user of the portable electronic device 62 and so on. It should be noted that the receipt of the owner name via user input is merely an example, as the owner name may be received from another module associated with the portable electronic device 62.

The UI control module 302 also outputs user interface data 314. In one example, the user interface data 314 comprises a graphical and/or textual interface that prompts the user of the portable electronic device 62 to input the owner name, employee number and/or badge number. In certain examples, the user interface data 314 may comprise a graphical and/or textual interface that indicates the work vehicle 10 from which the machine identification signal 80 is received.

The communications control module 304 receives as input beacon data 316. The beacon data 316 comprises the machine identification signal 80 actively transmitted by the machine identification beacon 78. The communications control module 304 interprets the beacon data 316 and sets a beacon identifier 318 for the operator identification module 306. The beacon data 316 comprises the universally unique identifier received from the machine identification signal 80.

The communications control module 304 also receives as input operator data 320. The operator data 320 comprises the unique identifier of the owner of the portable electronic device 62 and a particular work vehicle 322. Based on the operator data 320, the communications control module 304 outputs the operator identifier data 232 for the controller 44 to the work vehicle 322 identified based on the beacon identifier 318. Generally, the communications control module 304 sets the operator identifier data 232 for the device communication component 66 to transmit the operator identifier data 232 over a suitable communication protocol, such as a Wi-Fi standard.

Based on the beacon data 316, the communications control module 304 also outputs the notification 238. In this regard, once the beacon data 316 is no longer available, such that the beacon data 316 is no longer received by the device communication component 66, the communications control module 304 outputs the notification 238 for the controller 44. As discussed, the notification 238 indicates that the portable electronic device 62 is no longer in the proximity of the machine identification beacon 78.

The beacon data store 308 stores one or more tables (e.g., lookup tables) that indicate a work vehicle based on the machine identification signal 80 actively transmitted by the machine identification beacon 78. In other words, the beacon data store 308 stores one or more tables that provide the work vehicle 322 based on the universally unique identifier indicated in the beacon identifier 318. As an example, one or more tables can be indexed by various parameters such as, but not limited to, universally unique identifier, to provide the particular work vehicle 322. It should be noted that the use of the beacon data store 308 is an example, as the device controller 72 may output the operator identifier data 232 based solely on the reception of the beacon data 316.

The operator identification module 306 receives as input the beacon identifier 318 and the owner data 312. Based on the receipt of the beacon identifier 318, the operator identification module 306 queries the beacon data store 308 and retrieves the work vehicle 322 associated with the beacon identifier 318. The operator identification module 306 sets the operator data 320 for the communications control module 304 based on the retrieved work vehicle 322 and the owner data 312. The operator data 320 includes the unique identifier of the operator based on the owner data 312 and the particular work vehicle 322 identified by the beacon identifier 318. In certain examples, the unique identifier of the operator comprises the name, employee number and/or badge number of the operator from the owner data 312 and a serial number of the portable electronic device 62. The serial number of the portable electronic device 62 may be received from another module associated with the device control module 88 and/or may be retrieved from a data store associated with the device controller 72.

Figure 5:
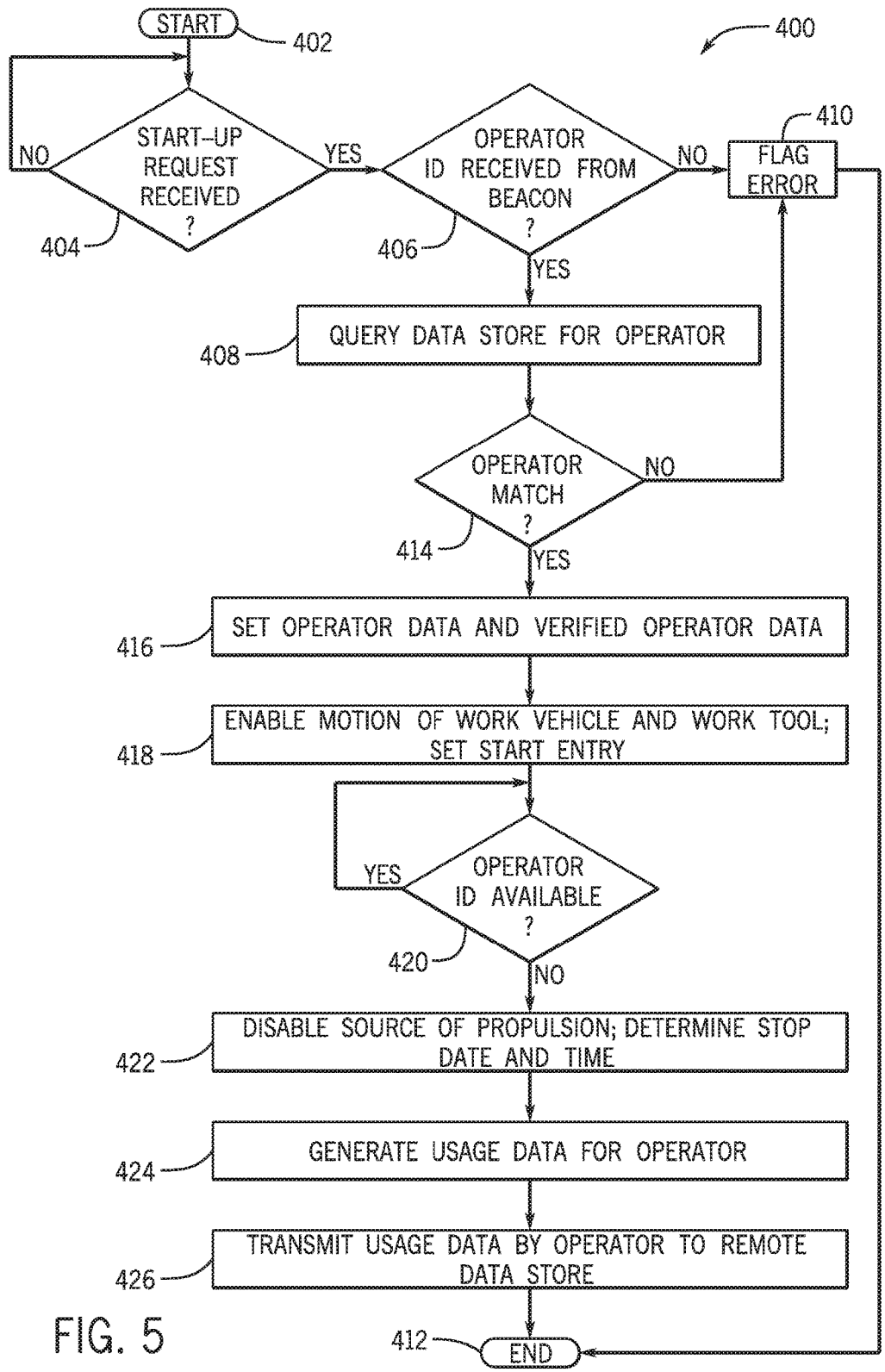
FIG. 5 is a flowchart illustrating an example control method of the disclosed operator identification control system of FIG. 1 in accordance with one of various embodiments.

Referring now also to FIG. 5, a flowchart illustrates a control method 400 that may be performed by the controller 44 of FIGS. 1-3 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure.

In various embodiments, the method may be scheduled to run based on predetermined events, and/or can run based on the receipt of input data 218.

In one example, with reference to FIG. 5, the method begins at 402. At 404, the method determines whether the input data 218 has been received, which requests a start-up of the source of propulsion, such as the engine 30, of the work vehicle 10. Based on the receipt of the input data 218, the method proceeds to 406. Otherwise, the method continues to determine whether the input data 218 has been received.

At 406, the method determines whether active operator data 228 has been received from the operator identification signal 90 actively transmitted by the operator identification beacon 64. Based on the active operator data 228 being received, the method proceeds to 408. Otherwise, at 410, the method flags an error and ends at 412. In certain embodiments, the method may also set error data for display on the display 47 of the human-machine interface 46, which indicates that the operator has not been identified to the controller 44.

At 408, the method queries the operator data store 208 based on the operator beacon identification data 230 received from the active operator data 228. At 414, the method determines whether an operator matches the operator beacon identification data 230. Stated another way, at 414, the method determines, based on the operator beacon identification data 230, if an operator is listed in the operator data store 208 that corresponds with the universally unique identifier received from the operator identification beacon 64. If the operator 242 is retrievable from the operator data store 208, at 416, the method retrieves the operator 242 and sets the operator data 246 and the verified operator data 244 to true. At 418, the method enables the motion of the work vehicle 10 and enables an operation of the work tool or load bin 14 by outputting enable data 248, and sets the start entry 255 for the usage data store 214.

At 420, the method determines whether the operator identification signal 90 is still available, such that the operator is still within proximity to the work vehicle 10. If the operator identification signal 90 is still received by the vehicle communication component 60, the method loops. If, however, the operator identification signal 90 is no longer being received, such that the operator identification beacon 64 is no longer in proximity to the controller 44, at 422, the method outputs the shutdown data 250 to disable the source of propulsion, such as the engine 30, and determines the stop date and time. At 424, the method generates the operator usage data 240, which includes the sensor data 252 acquired during the operation of the work vehicle 10 by the operator 242 from the start entry 255 to the stop date and time. At 426, the method transmits the operator usage data 240 via the vehicle communication component 60 to the remote system 92. The method ends at 412.

Figure 6:
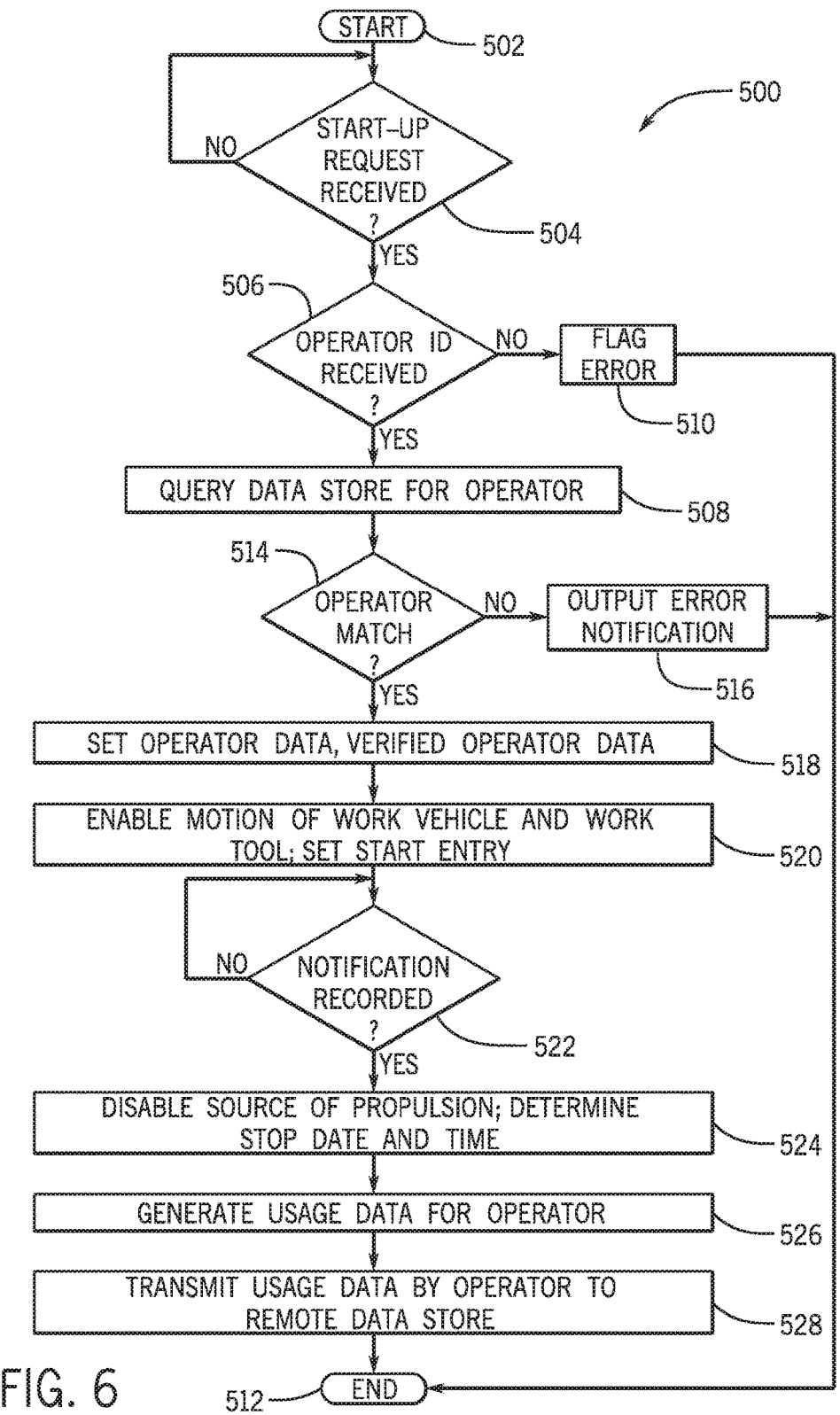
FIG. 6 is a flowchart illustrating an example control method of the disclosed operator identification control system of FIG. 1 in accordance with one of various embodiments.

Referring now to FIG. 6, a flowchart illustrates a control method 500 that may be performed by the controller 44 of FIGS. 1-3 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure.

In various embodiments, the method may be scheduled to run based on predetermined events, and/or can run based on the receipt of input data 218.

In one example, with reference to FIG. 6, the method begins at 502. At 504, the method determines whether the input data 218 has been received, which requests a start-up of the source of propulsion, such as the engine 30, of the work vehicle 10. Based on the receipt of the input data 218, the method proceeds to 506. Otherwise, the method continues to determine whether the input data 218 has been received.

At 506, the method determines whether operator identifier data 232 has been received from the portable electronic device 62. Based on the operator identifier data 232 being received, the method proceeds to 508. Otherwise, at 510, the method flags an error and ends at 512. In certain embodiments, the method may also set error data for display on the display 47 of the human-machine interface 46, which indicates that the operator has not been identified to the controller 44.

At 508, the method queries the operator data store 208 based on the operator identification data 234 received from the operator identifier data 232. At 514, the method determines whether an operator matches the operator identification data 234. Stated another way, at 514, the method determines, based on the operator identification data 234, if an operator is listed in the operator data store 208 that corresponds with the operator identifier data 232 received from the portable electronic device 62. If the method is unable to retrieve the operator 242 from the operator data store 208 based on the operator identification data 234, at 516, the method sets the unknown operator data 222 and outputs the user interface data 224 for display on the display 47, which indicates that the operator is unknown to the controller 44. The method ends at 512.

Otherwise, if the operator 242 is retrievable from the operator data store 208, at 518, the method retrieves the operator 242 and sets the operator data 246 and the verified operator data 244 to true. At 520, the method enables the motion of the work vehicle 10 and enables an operation of the work tool or load bin 14 by outputting the enable data 248, and sets the start entry 255 for the usage data store 214.

At 522, the method determines whether the notification 238 has been received, which indicates that the portable electronic device 62 associated with the operator is no longer in proximity to the work vehicle 10. If the notification 238 is received, the method proceeds to 524. Otherwise, the method loops.

At 524, the method outputs the shutdown data 250 to disable the source of propulsion, such as the engine 30, and determines the stop date and time. At 526, the method generates the operator usage data 240, which includes the sensor data 252 acquired during the operation of the work vehicle 10 by the operator 242 from the start entry 255 to the stop date and time. At 528, the method transmits the operator usage data 240 via the vehicle communication component 60 to the remote system 92. The method ends at 512.

Figure 7:
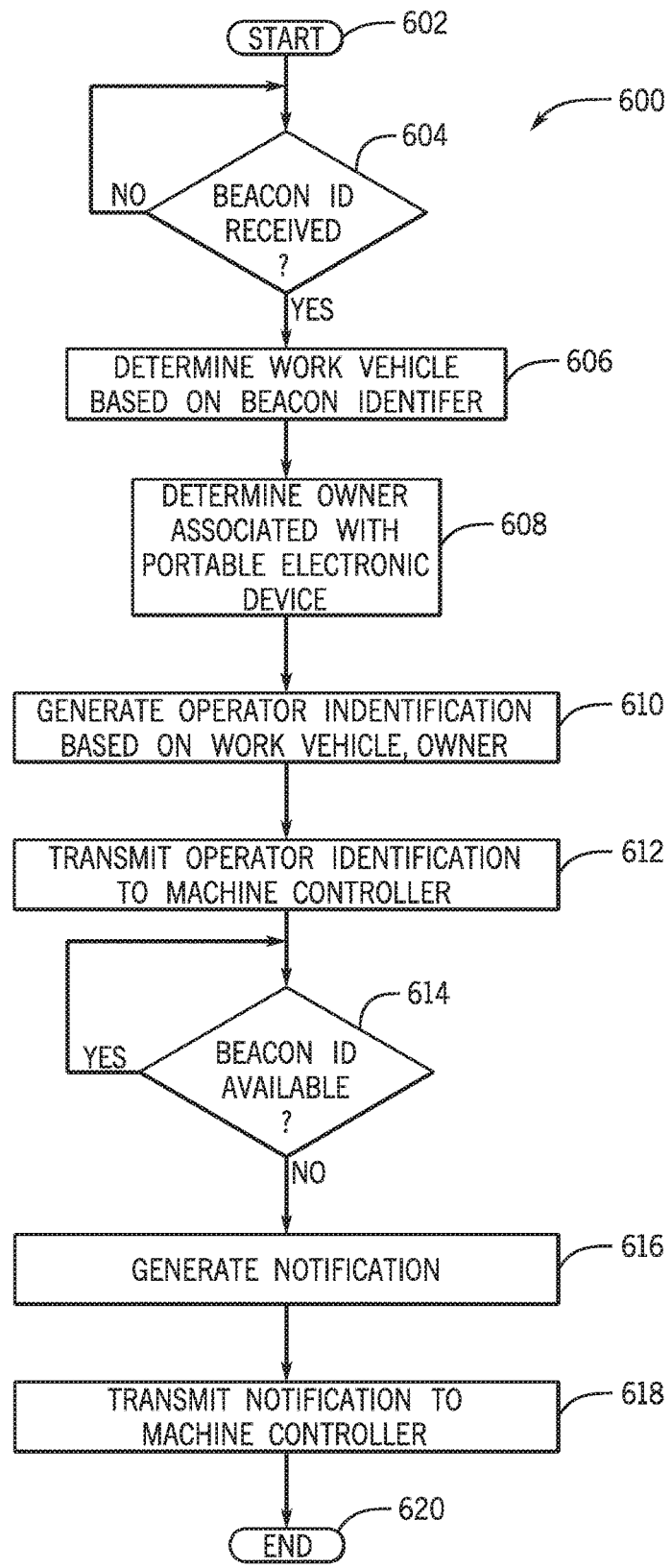
FIG. 7 is a flowchart illustrating an example control method of the disclosed operator identification control system of FIG. 1 in accordance with one of various embodiments.

Referring now also to FIG. 7, a flowchart illustrates a control method 600 that may be performed by the device controller 72 of FIGS. 1, 2 and 4 in accordance with the present disclosure. As can be appreciated in light of the disclosure, the order of operation within the method is not limited to the sequential execution as illustrated in FIG. 7, but may be performed in one or more varying orders as applicable and in accordance with the present disclosure.

In various embodiments, the method may be scheduled to run based on predetermined events, and/or can run based on the receipt of the machine identification signal 80.

With reference to FIG. 7, the method begins at 602. At 604, the method determines whether the machine identification signal 80 has been received by the device communication component 66, such that the beacon data 316 has been received. At 606, based on the beacon data 316 being received, the method determines the work vehicle 322 based on the beacon identifier 318. In one example, the method queries the beacon data store 308 based on the beacon identifier 318 to retrieve the work vehicle 322. At 608, the method determines the owner associated with the portable electronic device 62, which may be received via input to the input device 74. At 610, the method generates the operator data 320 based on the work vehicle 322, the owner data 312 and the serial number of the portable electronic device 62.

At 612, the method transmits the operator identifier data 232 to the controller 44 of the work vehicle 10 via the device communication component 66. At 614, the method determines whether the machine identification signal 80 is still available, such that the portable electronic device 62 is still within proximity to the work vehicle 10. If the machine identification signal 80 is still received by the device communication component 66, the method loops. If, however, the machine identification signal 80 is no longer being received, such that the machine identification beacon 78 is no longer in proximity to the portable electronic device 62, at 616, the method outputs the notification 238. At 618, the method transmits the notification 238 to the controller 44 of the work vehicle 10 via the device communication component 66. The method ends at 620.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An operator identification control system for a work vehicle, comprising:
    a beacon onboard the work vehicle providing one-way transmission to continuously broadcast a beacon signal containing a machine identification;
    an operator device having a communication component providing two-way communication and receiving the machine identification of the beacon signal, the operator device having a controller that receives and processes the received machine identification to determine an operator identification that identifies an operator, the device communication component transmitting a device signal containing the operator identification;
    a vehicle communication component onboard the work vehicle receiving the operator identification of the device signal from the communication component of the operator device; and
    a vehicle controller onboard the work vehicle enabling an operation of the work vehicle by the operator when the operator identification is associated with the work vehicle;
    wherein the vehicle controller disables the operation of the work vehicle by the operator when the beacon signal is no longer received by the operator device.

2. The operator identification control system of claim 1, wherein the vehicle controller processes the operator identification to determine whether the operator is associated with the work vehicle.

3. The operator identification control system of claim 1, wherein the vehicle controller determines usage data indicating a usage of the work vehicle by the operator; and
    wherein the vehicle communication component transmits the usage data to a system remote from the work vehicle and the operator device.

4. The operator identification control system of claim 1, wherein the operator device controller generates a notification when the beacon signal is no longer received;
    wherein the operator device communication component transmits a notification signal containing the notification;
    wherein the vehicle communication component receives the notification of the notification signal; and
    wherein the vehicle controller processes the notification to disable the operation of the work vehicle by the operator.

5. The operator identification control system of claim 1, wherein the beacon has a Bluetooth® transmitter that actively transmits the beacon signal containing the machine identification over a Bluetooth® communication protocol.

6. The operator identification control system of claim 5, wherein the operator device communication component includes a Bluetooth® receiver that receives the beacon signal and a wireless transmitter that communicates the device signal over a wireless communication protocol to the vehicle communication component.

7. The operator identification control system of claim 1, wherein the operator device comprises a portable electronic device.

8. An operator identification control method for a work vehicle, the method comprising:
    broadcasting continuously, by a beacon onboard the work vehicle, a beacon signal containing a machine identification;
    receiving, by a communication component of an operator device, the machine identification of the beacon signal;
    processing, by a controller of the operator device, the machine identification to determine an operator identification that identifies an operator;
    transmitting, by the operator device communication component, a device signal containing the operator identification;
    receiving, by a vehicle communication component onboard the work vehicle, the operator identification of the device signal from the communication component of the operator device;
    enabling, by a vehicle controller onboard the work vehicle, an operation of the work vehicle by the operator when the operator identification is associated with the work vehicle; and
    disabling, by the vehicle controller, the operation of the work vehicle by the operator when the beacon signal is no longer received by the operator device.

9. The method of claim 8, further including:
    processing, by the vehicle controller, the operator identification to determine whether the operator is associated with the work vehicle.

10. The method of claim 8, further including:
    determining, by the vehicle controller, usage data indicating a usage of the work vehicle by the operator; and transmitting, by the vehicle communication component, the usage data to a system remote from the work vehicle and the operator device.

11. The method of claim 8, wherein the disabling the operation of the work vehicle by the operator includes:
generating, by the operator device controller, a notification when the beacon signal is no longer received;
transmitting, by the operator device communication component, a notification signal containing the notification;
receiving, by the vehicle communication component, the notification of the notification signal; and
processing, by the vehicle controller, the notification to disable the operation of the work vehicle by the operator.

12. The method of claim 8, wherein the beacon has a Bluetooth® transmitter that actively transmits the beacon signal containing the machine identification over a Bluetooth® communication protocol.

13. The method of claim 12, wherein the operator device communication component includes a Bluetooth® receiver that receives the beacon signal and a wireless transmitter that communicates the device signal over a wireless communication protocol to the vehicle communication component.

14. The method of claim 8, wherein the operator device comprises a portable electronic device.

* * * * *